(12) United States Patent
Matsushita

(10) Patent No.: US 12,195,624 B2
(45) Date of Patent: Jan. 14, 2025

(54) TIRE

(71) Applicant: BRIDGESTONE CORPORATION, Tokyo (JP)

(72) Inventor: Junko Matsushita, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 912 days.

(21) Appl. No.: 17/294,868

(22) PCT Filed: Nov. 6, 2019

(86) PCT No.: PCT/JP2019/043509
§ 371 (c)(1),
(2) Date: May 18, 2021

(87) PCT Pub. No.: WO2020/105438
PCT Pub. Date: May 28, 2020

(65) Prior Publication Data
US 2022/0010102 A1    Jan. 13, 2022

(30) Foreign Application Priority Data

Nov. 22, 2018   (JP) ................................. 2018-219563

(51) Int. Cl.
*C08L 7/00*   (2006.01)
*B60C 7/14*   (2006.01)
(Continued)

(52) U.S. Cl.
CPC ................ *C08L 7/00* (2013.01); *B60C 7/146* (2021.08); *B60C 7/18* (2013.01); *C08J 5/124* (2013.01);
(Continued)

(58) Field of Classification Search
CPC ... B60C 7/18; B60C 7/146; B60C 2001/0091; C08L 7/00; C08L 67/02; C08J 5/124; C09J 163/00; C09J 5/00; C09J 175/04
See application file for complete search history.

(56) References Cited

U.S. PATENT DOCUMENTS 5,343,916 A  *  9/1994  Duddey ................. B60C 7/107
                                                                   152/5
9,387,725 B2    7/2016  Fudemoto et al.
(Continued)

FOREIGN PATENT DOCUMENTS

EP      2 610 071 A1    7/2013
JP      48-42943 B1    12/1973
(Continued)

OTHER PUBLICATIONS

International Preliminary Report on Patentability with the translation of Written Opinion dated May 25, 2021 from the International Bureau in International Application No. PCT/JP2019/043509.
(Continued)

*Primary Examiner* — Kip T Kotter
(74) *Attorney, Agent, or Firm* — Sughrue Mion, PLLC

(57) ABSTRACT

An object of the present disclosure is to improve, in a tire having a composite body of a member composed of a polyester material and a member composed of a rubber material, adhesion between the two members. In order to achieve the object, the present disclosure provides a tire having a composite body, wherein the composite body comprises: a member composed of a polyester material; a member composed of a rubber material; and an adhesive layer composed of a urethane-based adhesive or an epoxy-based adhesive and provided between the member composed of a polyester material and the member composed of a rubber material.

16 Claims, 5 Drawing Sheets

(51) Int. Cl.
*B60C 7/18* (2006.01)
*C08J 5/12* (2006.01)
*C08L 67/02* (2006.01)
*C09J 5/00* (2006.01)
*C09J 163/00* (2006.01)
*C09J 175/04* (2006.01)

(52) U.S. Cl.
CPC .................. *C08L 67/02* (2013.01); *C09J 5/00* (2013.01); *C09J 163/00* (2013.01); *C09J 175/04* (2013.01); *C08J 2307/00* (2013.01); *C08J 2367/02* (2013.01); *C08J 2475/04* (2013.01); *C08L 2205/025* (2013.01); *C08L 2205/03* (2013.01); *C08L 2207/04* (2013.01); *C09J 2407/006* (2013.01); *C09J 2463/00* (2013.01); *C09J 2467/006* (2013.01); *C09J 2475/00* (2013.01)

(56) References Cited

U.S. PATENT DOCUMENTS

| | | | |
|---|---|---|---|
| 10,259,264 | B2 | 4/2019 | Vilcot |
| 10,654,318 | B2 | 5/2020 | Kim et al. |
| 2016/0089935 | A1* | 3/2016 | Iwamura .................. B60C 7/14 264/135 |
| 2017/0121477 | A1 | 5/2017 | Nishii |
| 2017/0129285 | A1* | 5/2017 | Toyosawa ................. B60C 7/00 |
| 2018/0001699 | A1 | 1/2018 | Shoji |
| 2018/0236815 | A1* | 8/2018 | Yokoyama ............. C08C 19/22 |

FOREIGN PATENT DOCUMENTS

| | | | |
|---|---|---|---|
| JP | 2001-323081 A | 11/2001 | |
| JP | 2012-35792 A | 2/2012 | |
| JP | 2012-218170 A | 11/2012 | |
| JP | 2014-91453 A | 5/2014 | |
| JP | 2014-166831 A | 9/2014 | |
| JP | 2016-222051 A | 12/2016 | |
| JP | 2018-16303 A | 2/2018 | |
| JP | 2018-504311 A | 2/2018 | |
| JP | 2018-193046 A | 12/2018 | |
| KR | 10-2017-0085882 A | 7/2017 | |
| NL | 2002956 C  * | 12/2010 | ............... B60C 7/18 |
| WO | 2012/026548 A1 | 3/2012 | |
| WO | 2015/194085 A1 | 12/2015 | |
| WO | 2015/194088 A1 | 12/2015 | |

OTHER PUBLICATIONS

Extended European Search Report dated Jul. 4, 2022 in European Application No. 19887419.0.
International Search Report for PCT/JP2019/043509 dated Jan. 28, 2020 (PCT/ISA/210).

* cited by examiner

TIRE

CROSS REFERENCE TO RELATED APPLICATIONS

This application is a National Stage of International Application No. PCT/JP2019/043509 filed Nov. 6, 2019, claiming priority based on Japanese Patent Application No. 2018-219563 filed Nov. 22, 2018.

TECHNICAL FIELD

The present invention relates to a tire.

BACKGROUND ART

In recent years, there has been proposed a tire of which internal portion does not need to be inflated with pressurized air so that occurrence of puncture can be avoided. For example, PTL 1 discloses a non-pneumatic tire having: an attachment body attached to an axle; a ring member including an inner rim body fitted onto the attachment body and an outer rim body configured to surround the inner rim body from the outer side in the tire radial direction; a plurality of connecting members provided along the tire circumferential direction between the inner rim body and the outer rim body and configured to connect the two rim bodies such that they can be elastically displaceable relative to each other; and a tread member disposed at the outer circumferential surface of the outer rim body over the entire circumference thereof. Further, PTL 1 discloses that the tread member of the non-pneumatic tire is formed preferably by a vulcanized rubber and that a material of elastic connecting plates of the non-pneumatic tire is preferably a thermoplastic resin. A polyamide material has been primarily studied as the thermoplastic resin in the prior art in this regard.

CITATION LIST

Patent Literature

PTL 1: JP 2014-091453 Laid-Open

SUMMARY

The inventor of the present disclosure, as a result of a keen study of various types of materials for use in what is called a "skeleton member" such as the outer rim body and the connecting member of the non-pneumatic tire described above, discovered that a polyester material is advantageous in terms of cost and availability thereof. However, the inventor also realized as a result of a further study that the polyester material still has room for improvement in terms of adhesion or adhesiveness to a rubber material for use in the tread member.

In view of this, an object of the present disclosure is to solve the aforementioned prior art problem and provide a tire having a composite body of a member composed of a polyester material and a member composed of a rubber material, wherein adhesion between the member composed of a polyester material and the member composed of a rubber material has been improved.

The primary features of the present disclosure for solving the aforementioned prior art problem are as follows.

A tire of the present disclosure is characterized in that it has a composite body, wherein the composite body comprises: a member composed of a polyester material; a member composed of a rubber material, and an adhesive layer composed of a urethane-based adhesive or an epoxy-based adhesive and provided between the member composed of a polyester material and the member composed of a rubber material. The tire of the present disclosure as described above has high adhesion or adhesiveness between the member composed of a polyester material and the member composed of a rubber material.

In a preferable example of the tire of the present disclosure, the polyester material includes at least one selected from the group consisting of polybutylene terephthalate and thermoplastic copolyester. The material is easily available at low cost and durability of the tire advantageously improves in this case.

In another preferable example of the tire of the present disclosure, the adhesive layer is composed of a urethane-based adhesive. Adhesion between the member composed of a polyester material and the member composed of a rubber material is further improved in this case.

In the tire of the present disclosure, it is preferable that at least a portion adjacent to the adhesive layer, of the member composed of a rubber material, is composed of a rubber composition in which the total content of antioxidant, stearic acid and surfactant (dispersant) is ≤4.5 parts by mass with respect to 100 parts by mass of a rubber component. Adhesion between the member composed of a polyester material and the member composed of a rubber material is further improved in this case.

In the present disclosure, a content of the antioxidant in the rubber composition is preferably ≥1 parts by mass with respect to 100 parts by mass of the rubber component. Weatherproofness of at least the portion adjacent to the adhesive layer, of the member composed of a rubber material, is improved in this case.

In the tire of the present disclosure, surface roughness (Ra) of the member composed of a polyester material is preferably in the range of 2 μm to 20 μm. Adhesion between the member composed of a polyester material and the member composed of a rubber material is further improved in this case.

It is preferable that the tire of the present disclosure is a non-pneumatic tire having a skeleton member and a tread member provided on the tire radial direction outer side of the skeleton member along at least a portion of the skeleton member, wherein: the skeleton member is the member composed of a polyester material and the tread member is the member composed of a rubber material; and the adhesive layer is provided between the skeleton member and the tread member. Adhesion between the skeleton member and the tread member improves, thereby improving durability of the tire, in this case.

In the present disclosure, it is preferable that the tread member has a plurality of rubber layers and the total content of antioxidant, stearic acid and surfactant (dispersant) is larger in a rubber layer thereof on the ground-contact side than in a rubber layer thereof adjacent to the adhesive layer. Weatherproofness and appearance of the tire improve in this case.

It is preferable that the tread member is constituted of two rubber layers. The tread member can be easily manufactured in this case.

It is preferable that a thickness of each of the rubber layers of the tread member is constant in the tire circumferential direction. Good performance of the tread member is uniformly demonstrated along the entire circumference thereof in this case.

It is preferable that the rubber layer adjacent to the adhesive layer, of the tread member, contains no antioxidant, stearic acid and surfactant (dispersant). Adhesion between the skeleton member and the tread member further improves in this case.

It is preferable that in the tread member a ratio of thickness of the rubber layer thereof adjacent to the adhesive layer with respect to thickness of the rubber layer thereof on the ground-contact side (i.e. thickness of the rubber layer adjacent to the adhesive layer/thickness of the rubber layer on the ground-contact side) is in the range of 1/1 to 1/9. Good adhesion or adhesiveness between the skeleton member and the tread member, as well as satisfactory weatherproofness and good appearance of the tire, can be achieved in a highly compatible manner in this case.

Further, it is preferable that the non-pneumatic tire has: a wheel portion attached to an axle: an inner rim fitted onto the wheel portion; an outer rim configured to surround the inner rim from the outer side in the tire radial direction; a plurality of connecting members provided along the tire circumferential direction between the inner rim and the outer rim and configured to connect the two rims; and a tread member disposed on the outer side in the tire radial direction of the outer rim, wherein: each of the inner rim, the outer rim and the connecting member collectively constituting the skeleton member is the member composed of a polyester material; the tread member is the member composed of a rubber material and the adhesive layer is provided between the outer rim and the tread member. Adhesion between the outer rim and the tread member improves, thereby improving durability of the tire, in this case.

According to the present disclosure, it is possible to provide a tire having a composite body of a member composed of a polyester material and a member composed of a rubber material, wherein adhesion between the member composed of a polyester material and the member composed of a rubber material has been improved.

BRIEF DESCRIPTION OF THE DRAWINGS in the accompanying drawings, wherein.

DETAILED DESCRIPTION

Hereinafter, a tire of the present disclosure will be demonstratively described in detail based on embodiments thereof.

A tire of the present disclosure is characterized in that it has a composite body including: a member composed of a polyester material; a member composed of a rubber material; and an adhesive layer composed of a urethane-based adhesive or an epoxy-based adhesive and provided between the member composed of a polyester material and the member composed of a rubber material.

In the composite body of the present disclosure, the member composed of a polyester material and the member composed of a rubber material are attached to each other byway of the adhesive layer composed of a urethane-based adhesive or an epoxy-based adhesive.

A polyamide material, which has been primarily studied as a material for use in a skeleton member of a non-pneumatic tire or the like in the prior art, adheres well to a rubber material by way of any of various types of adhesives. The inventor of the present disclosure noticed as a result of a keen study that a polyester material, on the other hand, has room for improvement in terms of adhesiveness to a rubber material. In view of this, the inventor of the present disclosure made a further study and discovered that: among the structural adhesives for use in attachment/bonding of structural components, a urethane-based adhesive or an epoxy-based adhesive effectively attaches a polyester material and a rubber material to each other; and adhesion between a member composed of a polyester material and a member composed of a rubber material significantly improves by attachment/bonding of the two members by way of an adhesive layer composed of a urethane-based adhesive or an epoxy-based adhesive. The mechanism of the improvement of adhesion described above is not particularly clear but it is assumed that adhesion between the member composed of a polyester material and the member composed of a rubber material improves by using a urethane-based adhesive or an epoxy-based adhesive because a urethane-based adhesive and an epoxy-based adhesive exhibit excellent reactivity to a polyester material, as well as excellent reactivity to a rubber material, respectively.

Figure 1:
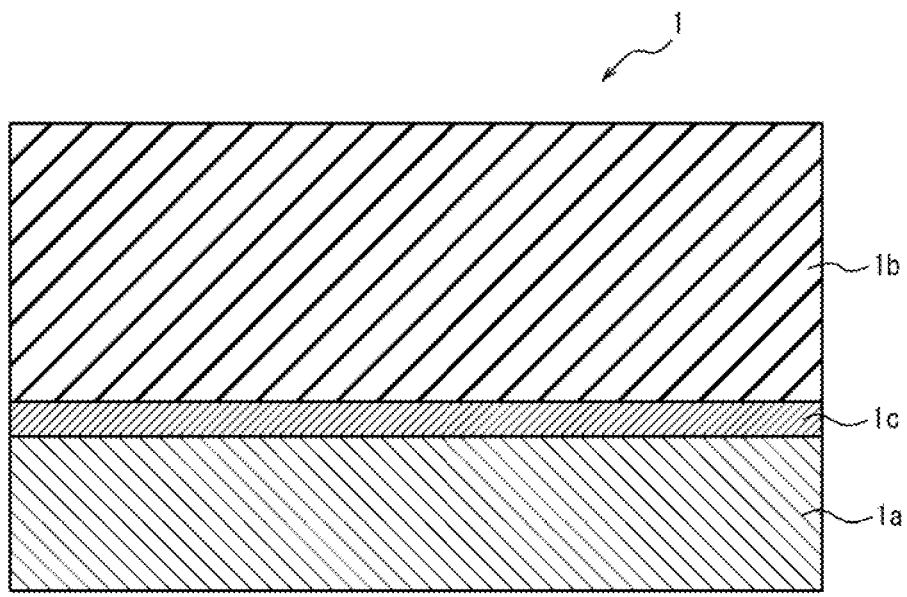
FIG. 1 is a cross sectional view schematically showing an example of a composite body provided in a tire according to an embodiment of the present disclosure, the view being cut along the thickness direction of the tire.

Next, an example of a composite body of a tire according to an embodiment of the present disclosure will be described with reference to FIG. 1. FIG. 1 is a cross sectional view schematically showing an example of a composite body provided in a tire of the present disclosure, the view being cut along the thickness direction of the tire. A composite body 1 shown in FIG. 1 includes: a member 1a composed of a polyester material; a member 1b composed of a rubber material; and an adhesive layer 1c provided between the member 1a composed of a polyester material and the member 1b composed of a rubber material, wherein the adhesive layer 1c is composed of a urethane-based adhesive or an epoxy-based adhesive.

Various types of resin compositions which include at least polyester can be used as a polyester material for use in the member 1a composed of a polyester material. In the present disclosure, examples of the polyester include a polyester resin, a thermoplastic copolyester (TPC), and the like.

The polyester resin is a resin having an ester bond in the main chain thereof. Although type of the polyester resin is not particularly restricted, crystalline polyester is preferable. Aromatic polyester can be used as the crystalline polyester. Aromatic polyester can be formed by, for example, from an aromatic dicarboxylic acid or an ester-forming derivative thereof and an aliphatic diol.

Examples of the aromatic polyester include polyethylene terephthalate, polybutylene terephthalate, polystyrene terephthalate, polyethylene naphthalate, polybutylene naphthalate, and the like. Polybutylene terephthalate (PBT) is preferable among these examples.

Specifically, polybutylene terephthalate derived from terephthalic acid and/or dimethyl terephthalate and 1,4-butanediol may be used as the aromatic polyester. Other specific examples of the aromatic polyester which may be used include: polyester derived from i) a dicarboxylic acid component such as isophthalic acid, phthalic acid, naphthalene-2,6-dicarboxylic acid, naphthalene-2,7-dicarboxylic acid, diphehyl-4,4'-dicarboxylic acid, diphenoxyethanedicarboxylic acid, 5-sulfoisophthalic acid, or ester-forming derivatives thereof and ii) a diol having molecular weight of ≤300 such as α) an aliphatic diol, like ethylene glycol, trimethylene glycol, pentamethylene glycol, hexamethylene glycol, neopentyl glycol, decamethylene glycol, β) an alicyclic diol, like 1,4-cyclohexanedimethanol, tricyclodecanedimethylol, and γ) an aromatic diol, like xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, 4,4'-dihydroxy-p-quaterphenyl; and copolyester formed by using two or more types of the dicarboxylic acid components and the diol components described above. A multi-functional carboxylic acid component having three or more functional groups, a multi-functional oxyacid component, a multi-functional hydroxy component, and the like may also be copolymerized by the amount of 5 moll % or less in the aromatic polyester in this regard.

Commercially available products may be used as the polyester resin described above and examples thereof include: "DURANEX®" products such as "DURANEX® 2000", "DURANEX 2002®" manufactured by Polyplastics Co., Ltd.; "NOVADURAN®" products such as "NOVADURAN® 5010R5". "NOVADURAN® 5010R3-2" manufactured by Mitsubishi Engineering-Plastics Corporation; "TORAYCON" products such as "TORAYCON® 1401X06", "TORAYCON® 1401X31", "TORAYCON® 1401X70" manufactured by TORAY Industries, Inc.; "PLANAC®" products such as "PLANAC® BT-1000" manufactured by TOYOBO Co., Ltd.; and the like.

The thermoplastic copolyester (TPC) is a polymeric compound having elasticity. Specifically, the TPC represents a thermoplastic resin material formed by a copolymer composed of a polymer constituting a crystalline hard segment having a high melting point and a polymer constituting an amorphous soft segment having low glass transition temperature, wherein the polymer constituting the hard segment has an ester bond in the main chain thereof.

Aromatic polyester can be used as crystalline polyester for constituting the hard segment of the thermoplastic copolyesters (TPC). The aromatic polyester can be formed by, for example, from an aromatic dicarboxylic acid or an ester-forming derivative thereof and an aliphatic diol. Examples of the aromatic polyester for constituting the hard segment include polyethylene terephthalate, polybutylene terephthalate, polystyrene terephthalate, polyethylene naphthalate, polybutylene naphthalate, and the like. Polybutylene terephthalate is preferable among these examples. Specifically, polybutylene terephthalate derived from terephthalic acid and/or dimethyl terephthalate and 1,4-butanediol may be used as the aromatic polyester suitable for constituting the hard segment. Other specific examples of the aromatic polyester suitable for constituting the hard segment may include: polyester derived from i) a dicarboxylic acid component such as isophthalic acid, phthalic acid, naphthalene-2,6-dicarboxylic acid, naphthalene-2,7-dicarboxylic acid, diphehyl-4,4'-dicarboxylic acid, diphenoxyethanedicarboxylic acid, 5-sulfoisophthalic acid, or ester-forming derivatives thereof and ii) a diol component such as ethylene glycol, trimethylene glycol, pentamethylene glycol, hexamethylene glycol, neopentyl glycol, decamethylene glycol, 1,4-cyclohexanedimethanol, tricyclodecanedimethylol, xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, 4,4'-dihydroxy-p-quaterphenyl; and copolyester formed by using two or more types of the dicarboxylic acid components and the diol components described above.

Examples of the polymer for constituting the soft segment of the thermoplastic copolyester (TPC) include a polymer selected from aliphatic polyether and aliphatic polyester. Examples of the aliphatic polyether include poly(ethylene oxide)glycol, poly(propylene oxide)glycol, poly(tetramethylene oxide)glycol, poly(hexamethylene oxide)glycol, a copolymer of ethylene oxide and propylene oxide, an ethylene oxide addition polymer of poly(propylene oxide) glycol, a copolymer of ethylene oxide and tetrahydrofuran, and the like.

Examples of the aliphatic polyester include poly(ε-caprolactone), polyenantholactone, polycaprylolactone, poly(butylene adipate), poly(ethylene adipate), and the like. Among the examples of the aliphatic polyether and the aliphatic polyester described above, poly(tetramethylene oxide)glycol, an ethylene oxide addition polymer of poly (propylene oxide) glycol, poly(ε-caprolactone), poly(butylene adipate), poly(ethylene adipate), and the like are preferable in terms of the elastic properties of the resulting copolymer.

The thermoplastic copolyester can be synthesized by copolymerizing a polymer for constituting the hard segment and a polymer for constituting the soft segment according to the known method. Commercially available products can be used as the thermoplastic copolyester and examples thereof include: "Hytrel®" products such as "Hytrel® 3046", "Hytrel® 5557", "Hytrel® 5577", "Hytrel® 5577R-07" "Hytrel® 6347", "Hytrel® 4047", "Hytrel® 4767" "Hytrel® 4767N", "Hytrel® 4777" manufactured by DU PONT-TORAY Co., Ltd.; "PELPRENE®" products such as "PELPRENE® P30B", "PELPRENE® P40B", "PELPRENE® P40H" "PELPRENE® P55B", "PELPRENE® P70B", "PELPRENE® P90B" "PELPRENE® P150B", "PELPRENE® P280B", "PELPRENE® P4508" "PELPRENE® P150M", "PELPRENE® S1001", "PELPRENE® S2001", "PELPRENE® S5001", "PELPRENE® S6001", "PELPRENE® S9001" manufactured by TOYOBO Co., Ltd.; and the like.

It is preferable that the polyester material described above includes at least one selected from polybutylene terephthalate (PBT) and thermoplastic copolyester (TPC). Polybutylene terephthalate and thermoplastic copolyester have high durability, as welt as being inexpensive and easily available, thereby successfully improving durability of a tire.

In the tire of the present disclosure, surface roughness (Ra) of the member composed of a polyester material is preferably in the range of 2 μm to 20 μm. When surface roughness (Ra) of the member composed of a polyester material is in the range of 2 μm to 20 μm, adhesion between the member composed of a polyester material and the member composed of a rubber material is further improved. In the present disclosure, "surface roughness (Ra)" represents arithmetic average roughness (Ra) as prescribed by JIS B0601: 2001.

Examples of the means for adjusting surface roughness (Ra) of the member composed of a polyester material include rubbing a surface of the member composed of a polyester material with sandpaper, subjecting a mold for molding the member composed of a polyester material to embossing finish, and the like.

Examples of the rubber material which can be used for the member $1b$ composed of a rubber material include various types of rubber compositions containing at least a rubber component. The member $1b$ composed of a rubber material is formed preferably from the vulcanized rubber obtained by subjecting the rubber composition to vulcanization. The rubber composition can be prepared by: blending a rubber component composed of natural rubber and/or synthetic rubber (such as butadiene rubber, styrene-butadiene rubber, isoprene rubber) with a filler like carbon black, a crosslinking agent like sulfur, peroxide, a crosslinking accelerator, and the like; and subjecting a resulting compound to mixing and kneading, warming, extrusion, and the like.

Figure 2:
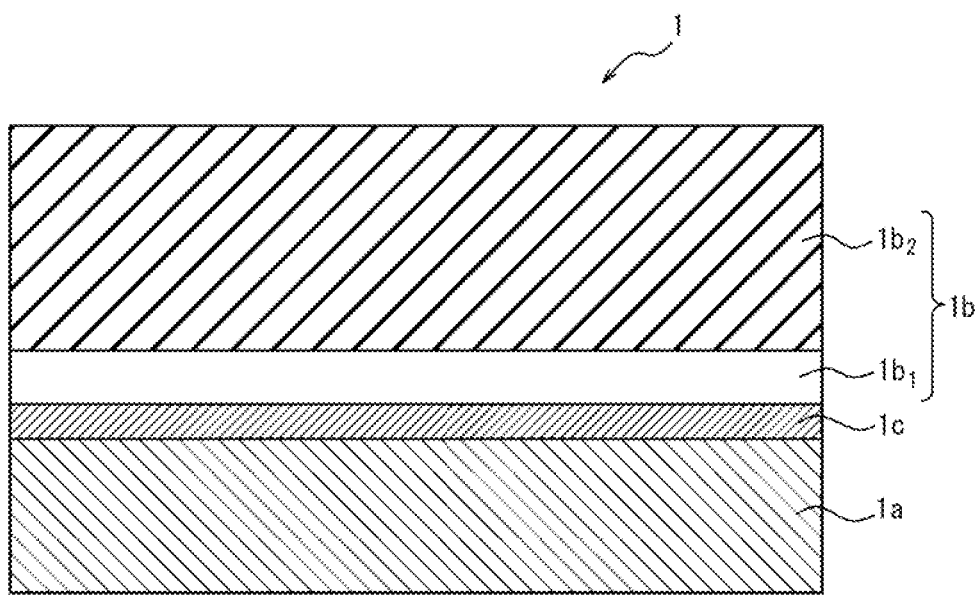
FIG. 2 is a cross sectional view schematically showing a preferable example of the composite body provided in the tire according to an embodiment of the present disclosure, the view being cut along the thickness direction of the tire.

The member $1b$ composed of a rubber material preferably includes a portion $1b_1$ adjacent to the adhesive layer $1c$ and a portion $1b_2$ not adjacent to the adhesive layer $1c$, as shown in FIG. 2.

FIG. 2 is a cross sectional view schematically showing a preferable example of the composite body provided in the tire of the present disclosure, the view being cut along the thickness direction of the tire. The composite body 1 shown in FIG. 2 has the member $1a$ composed of a polyester material, the member $1b$ composed of a rubber material, and the adhesive layer $1c$ provided between the member $1a$ composed of a polyester material and the member $1b$ composed of a rubber material. The member $1b$ composed of a rubber material is divided into the portion $1b_1$ adjacent to the adhesive layer $1c$ and the portion $1b_2$ not adjacent to the adhesive layer $1c$. The portion $1b_2$ not adjacent to the adhesive layer $1c$ is adjacent to a surface of the portion $1b_1$, which surface is opposite to the surface thereof ($1b_1$) adjacent to the adhesive layer $1c$.

In the tire of the present disclosure, at least a portion $1b_1$ adjacent to the adhesive layer $1c$, of the member $1b$ composed of a rubber material, is composed of a rubber composition in which the total content of antioxidant, stearic acid and surfactant (dispersant) is preferably ≤4.5 parts by mass, more preferably ≤2.5 parts by mass, with respect to 100 parts by mass of a rubber component. Antioxidant, stearic acid and surfactant (dispersant) in the portion $1b_1$ migrate to the adhesive layer $1c$ as time passes and may possibly inhibit the adhesion between the member $1a$ composed of a polyester material and the member $1b$ composed of a rubber material. However, such an adverse effect on the adhesion, caused by the antioxidant, the stearic acid and the surfactant (dispersant), will be small when the total content of antioxidant, stearic acid and surfactant (dispersant) is ≤4.5 parts by mass with respect to 100 parts by mass of a rubber component. Accordingly, it is possible to further improve adhesion between the member $1a$ composed of a polyester material and the member $1b$ composed of a rubber material in a case where a rubber composition in which the total content of antioxidant, stearic acid and surfactant (dispersant) is ≤4.5 parts by mass with respect to 100 parts by mass of a rubber component is used for at least the portion $1b_1$ adjacent to the adhesive layer $1c$, of the member $1b$ composed of a rubber material, as compared with a case where a rubber composition in which the total content of antioxidant, stearic acid and surfactant (dispersant) exceeds 4.5 parts by mass with respect to 100 parts by mass of a rubber component is used for at least the portion $1b_1$ of the member $1b$.

In this regard, it is preferable to use a rubber composition in which the total content of antioxidant, stearic acid and surfactant (dispersant) exceeds 4.5 parts by mass with respect to 100 parts by mass of a rubber component for the portion $1b_2$ not adjacent to the adhesive layer $1c$, of the member $1b$ composed of a rubber material, in terms of ensuring good weatherproofness and good appearance of a tire.

The aforementioned total content of antioxidant, stearic acid and surfactant (dispersant) represents a value determined when a tire is manufactured unless specified otherwise in the present disclosure. Accordingly, said value of the total content of antioxidant, stearic acid and surfactant (dispersant) may change during use of the tire because respective contents of antioxidant, stearic acid and surfactant (dispersant) in the member composed of a rubber material may possibly change as the antioxidant, the stearic acid and the surfactant (dispersant) migrate between the rubber layers in the use. For example, there may be a case where a portion adjacent to the adhesive layer comes to contain antioxidant, stearic acid and surfactant (dispersant) during use of a tire, although the total content of antioxidant, stearic acid and surfactant (dispersant) in the portion adjacent to the adhesive layer was originally zero parts by mass when the tire was manufactured.

In the present disclosure, antioxidant causes an effect of preventing rubber from aging and examples thereof include amine-based antioxidant, phenol-based antioxidant, and the like. Amine-based antioxidant is preferable in terms of weatherproofness among these examples.

Stearic acid is a commonly used vulcanization accelerator for rubber.

Surfactant (disperser) causes an effect of activating an interface of a substance and improves dispersability of a compounding agent in the rubber composition. Examples of the surfactant (disperser) include stearic acid salt, stearylamine derivative (such as dimethylstearylamine), aromatic hydrocarbon resin, aliphatic hydrocarbon resin, low molecular weight polymer (such as styrene-butadiene copolymer, polybutadiene, polyisoprene, isobutylene-isoprene copolymer), and the like. "Low molecular weight polymer" represents polymer having weight average molecular weight of ≤50,000 and is not included in a rubber component in the present disclosure.

A content of the antioxidant in the rubber composition for use in the portion $1b_1$ adjacent to the adhesive layer $1c$ is preferably ≥1 parts by mass with respect to 100 parts by mass of the rubber component. The antioxidant inhibits adhesion between the member composed of a polyester material and the member composed of a rubber material but improves weatherproofness (resistance to deterioration by ozone) of the member composed of a rubber material, whereby weatherproofness of the portion adjacent to the adhesive, of the member composed of a rubber material, is improved when a content of the antioxidant in the rubber composition for use in the portion adjacent to the adhesive layer is ≥1 parts by mass with respect to 100 parts by mass of the rubber component.

It is preferable that the portion $1b_2$ not adjacent to the adhesive layer $1c$, of the member $1b$ composed of a rubber material, is also composed of a rubber composition of which antioxidant content is ≥1 parts by mass with respect to 100 parts by mass of the rubber component in terms of ensuring satisfactory weatherproofness.

The adhesive layer 1c is composed of a urethane-based adhesive or an epoxy-based adhesive. The urethane-based adhesive and the epoxy-based adhesive are preferably of one-pack curing type or two-pack curing type and more preferably of two-pack curing type.

Examples of the urethane-based adhesive of one-pack curing type include a moisture-curing adhesive containing urethane polymer having isocyanate groups.

Examples of the urethane-based adhesive of two-pack curing type include an adhesive having a main agent containing polyol and a curing agent containing isocyanate.

In the present disclosure, examples of the polyol include polyether polyol, polyester polyol, polycarbonate polyol, polycaprolactone polyol, polyolefin polyol, castor oil-based polyol, and the like. Polyester polyol is preferable among these examples. Examples of the polyester polyol include: polyester polyols obtained by causing polyvalent carboxylic acids like dicarboxylic acids such as terephthalic acid, isophthalic acid, 1,5-naphthalic acid, 2,6-naphthalic acid, succinic acid, glutaric acid, adipic acid, pimelic acid, suberic acid, azelaic acid, sebacic acid, decamethylene-dicarboxylic acid, dodecamethylene-dicarboxylic acid, to react with polyols such as ethylene glycol, propylene glycol, 1,3-propanediol, 1,4-butanediol, neopentyl glycol, 1,5-pentanediol, 1,6-hexanediol, diethylene glycol, cyclohexanediol poly-s-caprolactone polyol obtained by ring-opening polymerization of ε-caprolactone; and the like.

Examples of the isocyanate include 22-diphenylmethane diisocyanate, 2,4-diphenylmethane diisocyanate, 4,4-diphenylmethane diisocyanate, modified products, of liquid phase, of diphenylmethane diisocyanate, polymeric MDI (methane diisocyanate), tolylene diisocyanate, naphtalene1,5-disocyanate, 2-(methacryloyloxy)ethyl isocyanate, 2-(acryloyloxy)ethyl isocyanate, 1,1-bis(acryloyloxymethyl)ethyl isocyanate, hexamethylene diisocyanate, and the like.

Commercially available products can be used as the urethane-based adhesive described above and examples thereof include: "UT100B", "EP171" manufactured by Cemedine Co., Ltd.: "560" manufactured by 3M Ltd.; "NIPPORAN 2304", "NIPPORAN 3114" manufactured by Tosoh Corporation; "DA3146" manufactured by NOGAWA CHEMICAL Co., Ltd.; "TAKENATE XL3052-20", "TAKERIGHT 4010/4000B" manufactured by Mitsui Chemicals, Inc.; "7411", "7542" manufactured by LORD CORPORATION; and the like.

Examples of the epoxy-based adhesive of one-pack curing type include room temperature/heat curing type adhesives which include: latent curing agents such as ketimine, oxazolidine, an aldimine-based compound; and liquid epoxy resins.

Examples of the epoxy-based adhesive of two-pack curing type include an adhesive containing a main agent selected from liquid epoxy resins and a curing agent. In the present disclosure, examples of the liquid epoxy resins include bisphenol A-type epoxy resins, bisphenol F-type epoxy resins, bisphenol AD-type epoxy resins, cresol novolac type epoxy resins, phenol novolac type epoxy resins, ethylene glycol diglycidyl ether, glycerol triglycidyl ether, trimethyrolpropane triglycidyl ether, trimethyrolethane triglycidyl ether, pentaerythritol tetraglycidyl ether, hydroquinone diglycidyl ether, and the like.

Examples of the curing agent include normal aliphatic polyamine, diethylenetriamine, triethylenetetramine, tetraethylenepentamine, dipropylenediamine, diethylaminopropylamine, modified aliphatic polyamine, amine adduct, ketoimine, alicyclic polyamine, N-aminoethylpiperazine, menthenediamine, isophoronediamine, aromatic amine, m-xylenediamine, meta-phenylenediamine, diaminodiphenylmethane, diaminodiphenyl sulfone, polyamideamine, 2-methylimidazole, 2-ethyl-4-methylimidazole, 1-cyanoethyl-2-undecylimidazolium trimellitate, polythiol, polymercaptan, polysulfide, and the like.

Commercially available products can be used as the epoxy-based adhesive described above and examples thereof include: "Meltweld", "Silver chip" "T-88" manufactured by System Three Resins, Inc.; "Araldite RT30", "Araldite 2013", "Araldite 2014", "Araldite 2015" manufactured by Huntsman International LLC.; "EAE-30CL", "E-05CL", "U-10FL", "EA-E00CL" manufactured by Henkel AG & Co. KGaA; "3500", "3600" manufactured by Alteco Co., Ltd.; "DP 190" manufactured by 3M Ltd.; "AP 209", "AP 400ED" manufactured by TOAGOSEI Co., Ltd.; and the like.

The adhesive layer 1c is preferably composed of a urethane-based adhesive. Adhesion between the member 1a composed of a polyester material and the member 1b composed of a rubber material is further improved in a case where the adhesive layer 1c is composed of a urethane-based adhesive.

It is preferable that the tire of the present disclosure is a non-pneumatic tire having a skeleton member and a tread member provided on the tire radial direction outer side of the skeleton member along at least a portion of the skeleton member, wherein: the skeleton member is the member composed of a polyester material and the tread member is the member composed of a rubber material; and the adhesive layer is provided between the skeleton member and the tread member. Adhesion between the skeleton member and the tread member improves, thereby improving durability of the tire, in this case.

It is preferable that the tread member has a plurality of rubber layers and the total content of antioxidant, stearic acid and surfactant (dispersant) is larger in a rubber layer thereof on the ground-contact side than in a rubber layer thereof adjacent to the adhesive layer. Weatherproofness and appearance of the tire improve in this case because weatherproofness and appearance of the rubber layer on the ground-contact side of the tread member is improved by the large total content of antioxidant, stearic acid and surfactant (dispersant) in the rubber layer. Such a tread member having a plurality of rubber layers as described above can be manufactured by, for example, laminating rubber layers having different compositions in the tire radial direction.

Further, it is preferable that the rubber layer adjacent to the adhesive layer, of the tread member, contains no antioxidant, stearic acid and surfactant (dispersant). Adhesion between the skeleton member and the tread member further improves when the rubber layer adjacent to the adhesive layer, of the tread member, contains no antioxidant, stearic acid and surfactant (dispersant) because then no adverse effect is caused on adhesion between the skeleton member and the tread member by antioxidant, stearic acid and surfactant (dispersant).

It is preferable that the tread member is constituted of two rubber layers. A tread member constituted of two rubber layers, among tread members constituted of a plurality of rubber layers, can easily separate the function of a rubber layer adjacent to the adhesive layer from the function of a rubber on the ground-contact side by a simple structure, thereby allowing easy production of a tread member which achieves in a compatible manner both i) good adhesion between the skeleton member and the tread member and ii) satisfactory weatherproofness and good appearance, of a tire.

It is preferable that a thickness of each of the rubber layers of the tread member is constant in the tire circumferential direction. Good performance of the tread member is uniformly demonstrated along the entire circumference thereof when a thickness of each of the rubber layers thereof is constant in the tire circumferential direction.

It is preferable that in the tread member a ratio of thickness of the rubber layer thereof adjacent to the adhesive layer with respect to thickness of the rubber layer thereof on the ground-contact side (i.e. thickness of the rubber layer adjacent to the adhesive layer/thickness of the rubber layer on the ground-contact side) is in the range of 1/1 to 1/9. The function of the rubber layer adjacent to the adhesive layer, of the tread member, is fully demonstrated and adhesion between the skeleton member and the tread member further improves when the aforementioned ratio of thickness is ≥1/9. The function of the rubber layer on the ground-contact side, of the tread member, is fully demonstrated and weatherproofness and appearance of a tire further improve when the aforementioned ratio of thickness is ≤1/1.

In the present disclosure, it is preferable that the non-pneumatic tire has: a wheel portion attached to an axle; an inner rim fitted onto the wheel portion; an outer rim configured to surround the inner rim from the outer side in the tire radial direction; a plurality of connecting members provided along the tire circumferential direction between the inner rim and the outer rim and configured to connect the two rims, and a tread member disposed on the outer side in the tire radial direction of the outer rim, wherein: each of the inner rim, the outer rim and the connecting member collectively constituting the skeleton member is the member composed of a polyester material; the tread member is the member composed of a rubber material; and the adhesive layer is provided between the outer rim and the tread member. Adhesion between the outer rim and the tread member improves, thereby improving durability of the tire, in this case.

Next, a structure of a non-pneumatic tire as a tire according to an embodiment of the present disclosure will be described hereinafter.

Figure 3:
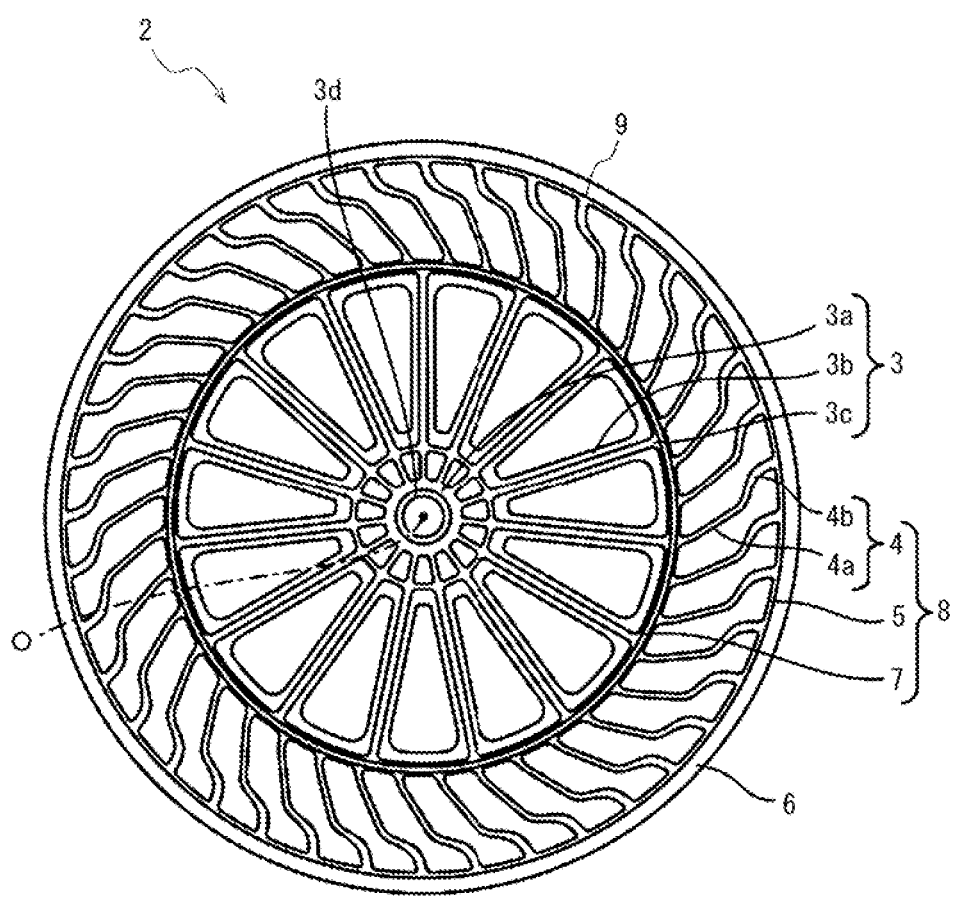
FIG. 3 is an explanatory tire side view schematically showing a structure of a non-pneumatic tire as a tire according to an embodiment of the present disclosure.

FIG. 3 is an explanatory tire side view schematically showing a structure of the non-pneumatic tire as a tire according to an embodiment of the present disclosure. It should be noted that dimensions of respective members may occasionally be changed from the actual dimensions thereof in order to ensure clearly recognizable sizes of the respective members in FIG. 3 and other drawings for use in explanation below.

As shown in FIG. 3, a non-pneumatic tire 2 has a wheel portion 3 attached to an axle (not shown) and a tire portion 8 provided on the outer periphery of the wheel portion 3. The non-pneumatic tire 2 is used for a bicycle, a motorcycle, a wheel chair, a golf cart, an automobile, and the like (which will be collectively referred to as "vehicles" hereinafter).

In the present disclosure, the wheel portion 3 is formed to have an annular disc-like configuration. The tire portion 8 is formed to have a ring-like configuration. The center axes of the wheel portion 3 and the tire portion 8 are coaxial, i.e. disposed on the common axis, respectively. This common axis will be referred to as "the center axis O" and the direction along the center axis O will be referred to as "the tire width direction". Further, a rotation direction around the center axis O on a side view seen from the tire width direction will be referred to as a "tire circumferential direction". A direction orthogonal to the center axis O will be referred to as a "tire radial direction".

As shown in FIG. 3, the wheel portion 3 includes: a cylindrical boss 3d extending in the tire width direction to be coaxial with the center axis O; a fitting rim portion 3a fixed on the outer periphery of the boss 3d; an outer fitting rim portion 3c configured to surround the fitting rim portion 3a from the outer side in the tire radial direction; and a plurality of ribs 3b for connecting the fitting rim portion 3a and the outer fitting rim portion 3c.

The boss 3d is formed by aluminum in the present embodiment. The boss 3d is rotatably supported by the axle, so that the wheel portion 3 is mounted on the axle. The boss 3d may be formed by metal other than aluminum or a non-metal material. A width of the boss 3d is larger than widths of the fitting rim portion 3a, the plurality of ribs 3b and the outer fitting rim portion 3c in the tire width direction.

The fitting rim portion 3a and the outer fitting rim portion 3c are disposed to be coaxial with the boss 3d, respectively. The plurality of ribs 3b are provided, for example, in the tire circumferential direction at equal intervals. The ribs 3b radially extend from the boss 3d as the center, respectively. The fitting rim portion 3a, the plurality of ribs 3b, and the outer fitting rim portion 3c are formed to be integral with each other by a thermoplastic resin in the present embodiment. Accordingly, the wheel portion 3 can be molded by injection molding on the boss 3d, which suits for mass production.

It should be noted that the boss 3d, the fitting rim portion 3a, the plurality of ribs 3b, and the outer fitting rim portion 3c may be formed to be separate from each other. Further, the fitting rim portion 3a, the plurality of ribs 3b, and the outer fitting rim portion 3c may be formed by a material other than a thermoplastic resin.

The tire portion 8 includes: an inner rim 7 fitted onto the outer fitting rim portion 3c of the wheel portion 3; an outer rim 5 configured to surround the inner rim 7 from the outer side in the tire radial direction; and a plurality of elastically deformable connecting members 4 provided along the tire circumferential direction between the inner rim 7 and the outer rim 5, for connecting the inner rim 7 and the outer rim 5 so that the two rims can be displaced from each other. A tread member 6 is fitted on the outer peripheral surface of the outer rim 5.

The inner rim 7 is mounted on the axle by way of the wheel portion 3. The center axes of the inner rim 7 and the outer rim 5 are disposed to be coaxial with the center axis O. The inner rim 7, the connecting members 4, and the outer rim 56 are disposed such that the middle portions in the tire width direction thereof coincide with each other in the tire width direction.

The inner rim 7, the connecting members 4, and the outer rim 5 are formed to be integral with each other by a resin composition in the present embodiment. Accordingly, the tire portion 8 can be molded by injection molding, which suits for mass production.

It should be noted that the inner rim 7, the connecting members 4, and the outer rim 5 may be formed to be separate from each other.

The tire portion 8 and the wheel portion 3 may be formed to be either integral with or separate from each other. The fitting rim portion 3a, the plurality of ribs 3b, and the outer fitting rim portion 3c of the wheel portion 3 function for connecting the boss 3d with the tire portion 8, respectively. The tire portion 8 functions for absorbing vibrations transmitted from the ground to the boss 3d. That is, the fitting rim portion 3a, the plurality of ribs 3b, and the outer fitting rim portion 3c of the wheel portion 3 function differently from the tire portion 8. Accordingly, the fitting rim portion 3a, the plurality of ribs 3b, and the outer fining rim portion 3c may be formed by a material different from a material for the tire portion 8.

The tread member 6 is formed, for example, by vulcanized rubber or the like, which is obtained by subjecting a rubber composition containing natural rubber and other components to vulcanization. An adhesive layer 9 as an interposition is provided between the outer rim 5 and the tread member 6 such that the adhesive layer 9 adheres the tread member 6 to the outer rim 5 in the present embodiment. A urethane-based adhesive or an epoxy-based adhesive is used for the adhesive layer.

Each of the connection members 4 is formed to have a rectangular plate-like configuration which is curved in entirety thereof. The connection member 4 is disposed such that the main and rear surfaces thereof face the tire circumferential direction and the side surfaces thereof face the tire width direction. The connection member 4 is formed by an elastically deformable material and connects the outer peripheral side of the inner rim 7 and the inner peripheral side of the outer rim 5 so that the two rims, 7, 5 can be elastically deformable relative to each other. A plurality of the connecting members 4 are provided along the tire circumferential direction at equal intervals therebetween.

Each of the plurality of connecting members 4 has an inner portion 4a connected to the inner rim 7 and an outer portion 4b connected to the outer rim 5. The inner portion 4a and the outer portion 4b are integrally connected at the middle portion, in the tire radial direction, of the connecting member 4 such that the inner portion 4a and the outer portion 4b meet each other to form an obtuse angle therebetween at the middle portion in a side view. A thickness in the tire circumferential direction of the inner portion 4a is smaller than a thickness in the tire circumferential direction of the outer portion 4b. The thickness in the tire circumferential direction of the outer portion 4b gradually increases toward the outer side in the tire radial direction.

In the non-pneumatic tire 2 of the present embodiment, the aforementioned skeleton portion corresponds to the inner rim 7, the outer rim 5, and the connecting members 4 of the tire, wherein the inner rim 7, the outer rim 5, and the connecting members 4 are formed by the polyester material described above. The tread member 6, on the other hand, is formed by the rubber material described above. The adhesive layer 9 composed of the urethane-based adhesive or then epoxy-based adhesive described above is provided between the outer rim 5 and the tread member 6.

It is possible to provide an inexpensive non-pneumatic tire by forming the inner rim 7, the outer rim 5, and the connecting member 4 by a polyester material.

Further, it is possible to improve adhesion between the outer rim 5 and the tread member 6 and thus durability of a tire by adhering the outer rim 5 and the tread member 6 to each other by way of the adhesive layer 9 composed of the urethane-based adhesive or then epoxy-based adhesive therebetween.

Next, a non-pneumatic tire as a tire according to another embodiment of the present disclosure will be described hereinafter.

Figure 4:
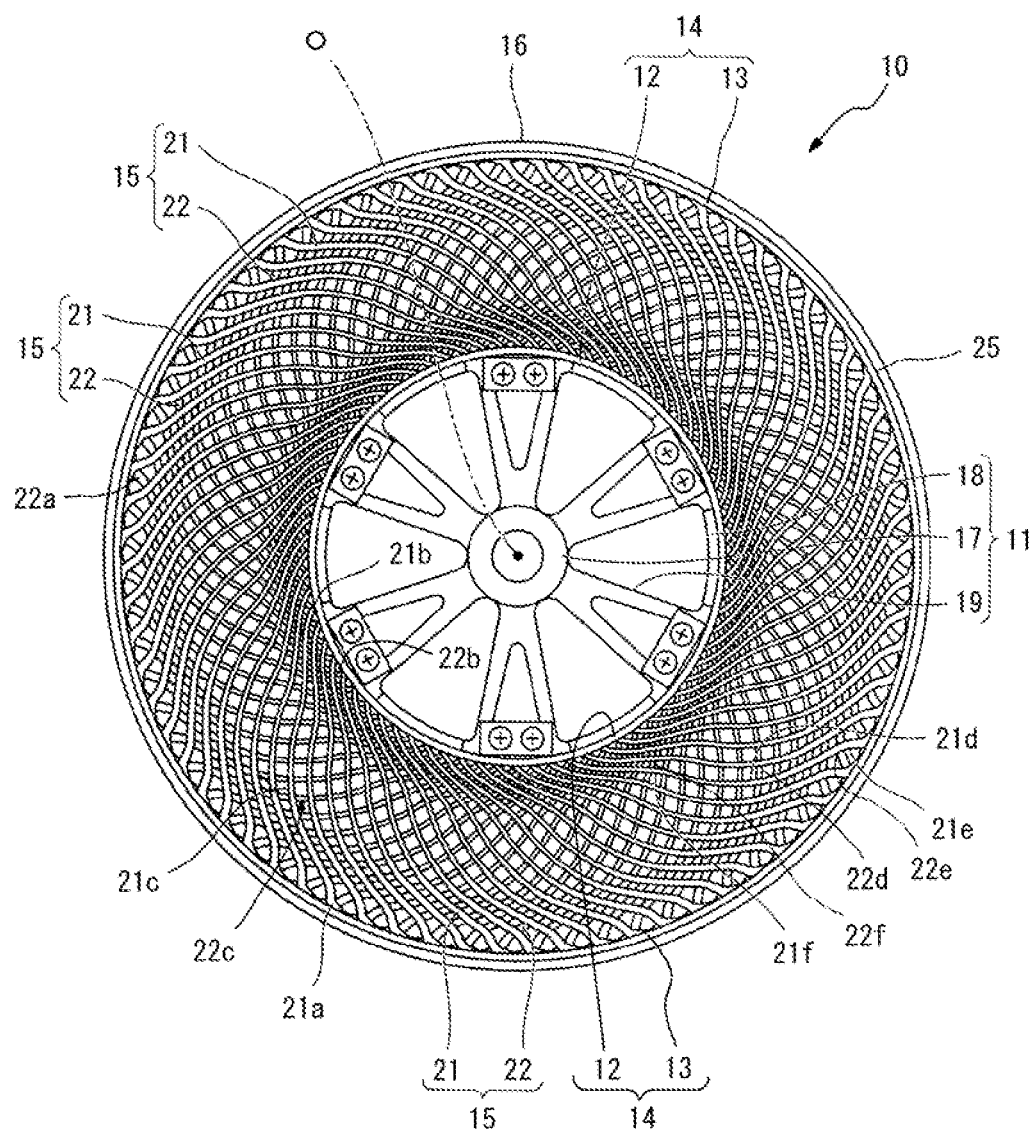
FIG. 4 is an explanatory tire side view schematically showing a structure of a non-pneumatic tire as a tire according to another embodiment of the present disclosure.
Figure 5:
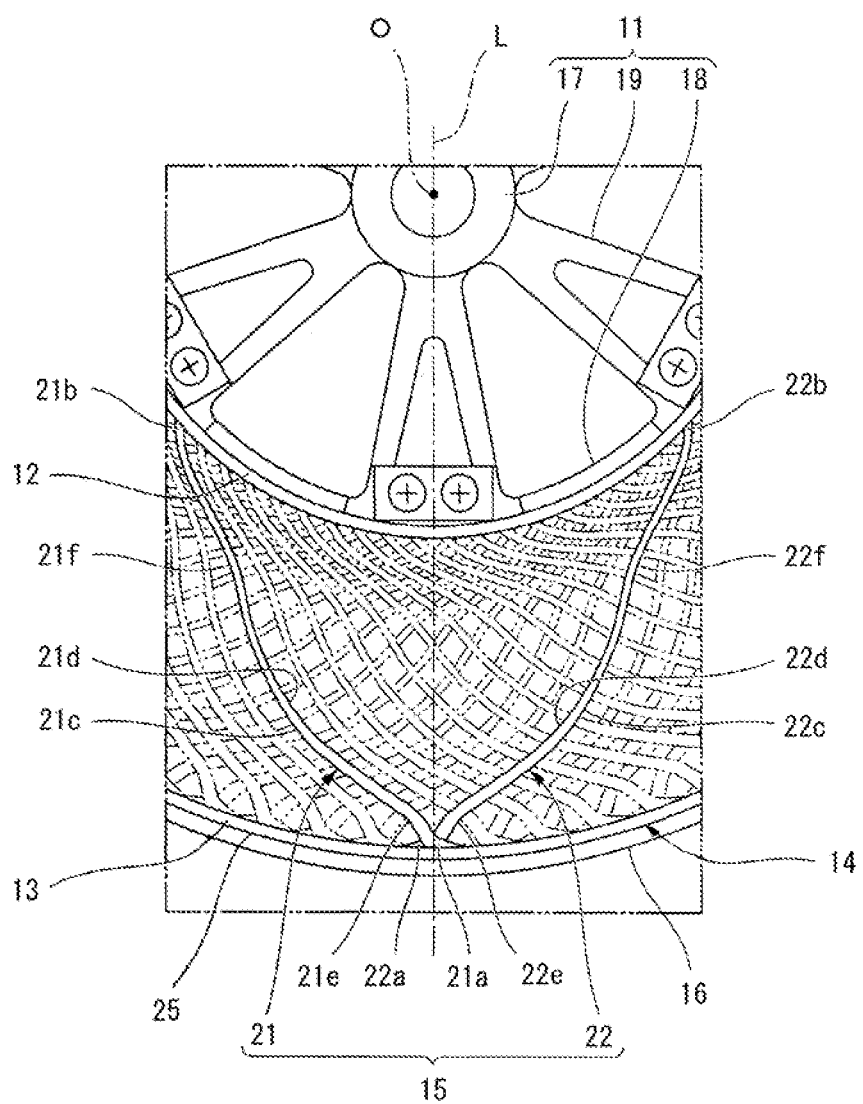
FIG. 5 is an explanatory view showing a portion of FIG. 4 in an enlarged manner.

FIG. 4 is an explanatory tire side view schematically showing a structure of the non-pneumatic tire as a tire according to another embodiment of the present disclosure. FIG. 5 is an explanatory view showing a portion of FIG. 4 in an enlarged manner. In FIG. 5, one of a plurality of first elastic connecting plates 21 and one of a plurality of second elastic connecting plates 22 described below are selectively depicted by solid lines in an emphasized manner, respectively, to facilitate understanding of readers.

As shown in FIG. 4 and FIG. 5, a non-pneumatic tire 10 of the present embodiment has: a wheel portion 11 attached to an axle (not shown); a ring member 14 including an inner rim 12 fitted onto the wheel portion 11 and an outer rim 13 configured to surround the inner rim 12 from the outer side in the tire radial direction; a plurality of connecting members 15 provided along the tire circumferential direction between the inner rim 12 and the outer rim 13 and configured to connect the two rims 12, 13; and a tread member 16 disposed on the outer side in the tire radial direction of the outer rim 13, wherein the tread member 16 is made of vulcanized rubber such that it integrally covers the outer periphery of the ring member 14.

The center axes of the wheel portion 11, the inner rim 12, the outer rim 13, and the tread member 16 are disposed to be coaxial with an imaginary common center axis and the middle portions in the tire width direction of the wheel portion 11, the inner rim 12, the outer rim 13, and the tread member 16 coincide with each other in the tire width direction. The imaginary common center axis will be referred to as "the axial line O" the direction along the axial line O will be referred to as "the tire width direction", a direction orthogonal to the axial line O will be referred to as "the tire radial direction", and a circumferential direction around the axial line O will be referred to a "tire circumferential direction" hereinafter.

The wheel portion 11 has: a fitting rim portion 17 fixed at an end portion of the axle; an outer ring portion 18 configured to surround the fitting rim portion 17 from the outer side in the tire radial direction; and a plurality of ribs 19 for connecting the fitting rim portion 17 and the outer ring portion 18 (refer to FIG. 4 and FIG. 5).

The fitting rim portion 17, the outer ring portion 18, and the ribs 19 are integrally formed by a metal material such as an aluminum alloy. The fitting rim portion 17 and the outer ring portion 18 are formed to be cylindrical and disposed to be coaxial with the axial line O, respectively. The plurality of ribs 19 are provided in the tire circumferential direction at equal intervals therebetween.

The connecting members 15 include first elastic connecting plates 21 and second elastic connecting plates 22 for connecting the inner rim 12 and the outer rim 13 t each other in the ring member 14. A plurality of the first elastic connecting plates 21 is provided in the tire circumferential direction at one side position in the tire width direction and a plurality of the second elastic connecting plates 22 is provided in the tire circumferential direction at the other side position in the tire width direction, which side position is different from the one side position. The first elastic connecting plates 21 and the second elastic connecting plates 22 are provided such that the total number thereof is, for example, sixty.

Specifically, a plurality of the first elastic connecting plates 21 is provided in the tire circumferential direction at the same one side position in the tire width direction and a plurality of the second elastic connecting plates 22 is provided in the tire circumferential direction at the same other side position in the tire width direction such that the second elastic connecting plates 22 are separated from the first elastic connecting plates 21 in the tire width direction.

The connecting members 15 are provided between the inner rim 12 and the outer rim 13 in the ring member 14 so as to be axisymmetric with respect to the axial line O, respectively. The entire connecting members 15 share the same configuration and the same size. A width in the tire width direction of the connecting member 15 is smaller than a width in the tire width direction of the outer rim 13.

The first elastic connecting plates 21 are adjacent, in the tire circumferential direction, to each other in a non-contact manner and the second elastic connecting plates 22 are adjacent, in the tire circumferential direction, to each other in a non-contact manner. Further, the first elastic connecting plates 21 and the second elastic connecting plates 22, which are adjacent to each other in the tire width direction, are not in contact with each other.

The first elastic connecting plates 21 and the second elastic connecting plates 22 share the same width in the tire width direction. Further, the first elastic connecting plates 21 and the second elastic connecting plates 22 share the same thickness in a side view of the tire.

In the present embodiment, one end portions 21a, connected to the outer rim 13, of the first elastic connecting plates 21 are shifted on one side in the tire circumferential direction with respect to the other end portions 21b, connected to the inner rim 12, of the first elastic connecting plates 21 and one end portions 22a, connected to the outer rim 13, of the second elastic connecting plates 22 are shifted on the other side in the tire circumferential direction with respect to the other end portions 22b, connected to the inner rim 12, of the second elastic connecting plates 22.

Further, the one end portion 21a of each first elastic connecting plate 21 and the one end portion 22a of the corresponding second elastic connecting plate 22 are disposed on the inner periphery of the outer rim 13 at positions which overlap each other in the tire circumferential direction on a side view but differ from each other in the tire width direction, respectively.

In the example shown in FIG. 4 and FIG. 5, each of the first elastic connecting plates 21 and the second elastic connecting plates 22 has, in the intermediate portion 21c, 22c thereof between the one end portion 21a, 22a and the other end portion 21b, 22b, a plurality of curved portions 21e, 21d, 21f; 22e, 22d, 22f which are respectively curved in the tire circumferential direction, such that the curved portions are distributed along the extending direction of the elastic connecting plate 21, 22 in a tire side view seen from the tire width direction of the tire 10. In each of the first elastic connecting plates 21 and the second elastic connecting plates 22, the direction in which each curved portion 21e, 21d, 21f; 22e, 22d, 22f is curved in the tire circumferential direction alternately changes (to the opposite direction) along the extending direction of the elastic connecting plate 21, 22.

Specifically, the plurality of curved portions 21e, 21d, 21f formed in each first elastic connecting plate 21 is constituted of: a first curved portion 21d curved to protrude toward the other side in the tire circumferential direction; a second curved portion 21e situated between the first curved portion 21d and the one end portion 21a and curved to protrude toward the one side in the tire circumferential direction; and a third curved portion 21f situated between the first curved portion 21d and the other end portion 21b and curved to protrude toward the one side in the tire circumferential direction.

The plurality of curved portions 22e, 22d, 22f formed in each second elastic connecting plate 22 is constituted of: a first curved portion 22d curved to protrude toward the one side in the tire circumferential direction; a second curved portion 22e situated between the first curved portion 22d and the one end portion 22a and curved to protrude toward the other side in the tire circumferential direction; and a third curved portion 22f situated between the first curved portion 22d and the other end portion 22b and curved to protrude toward the other side in the tire circumferential direction. In the example shown in the drawings, a radius of curvature of the first curved portion 21d, 22d is larger than radii of curvature of the second curved portion 21e, 22e and the third curved portion 21f, 22f in a tire side view. The first curved portion 21d, 22d is provided in the middle portion, in the extending direction, of each of the first elastic connecting plates 21 and the second elastic connecting plates 2.

The first elastic connecting plates 21 and the second elastic connecting plates 22 share the same length. Further, as shown in FIG. 5, the respective other end portions 21b, 22b, of each first elastic connecting plate 21 and the corresponding second elastic connecting plate 22 of which respective one end portions 21a, 22a overlap in a tire side view, are connected to the outer periphery of the inner rim 12 such that the other end portions 21b, 22b are shifted from the one end portions 21a, 22a in the tire circumferential direction by an angle of ±x° (+x° for the other end portion 22b and −x° for the other end portion 21b, in the range of 20°≤x≤135°, for example), respectively, wherein the angle x° is formed or defined in the tire side view by a line linking the axial line O and the other end portion 21b/22b with respect to a line linking the one end portions 21a, 22a and the axial line O/a position radially opposite thereto on the outer periphery of the inner rim 12. In this regard, the first curved portions 21d, 22d of each first elastic connecting plate 21 and the corresponding second elastic connecting plate 22 share the same radius of curvature but protrude toward the directions opposite to each other with respect to the line linking the one end portions 21a, 22a and the axial line O, respectively. Similarly, the second curved portions 21e, 22e of each first elastic connecting plate 21 and the corresponding second elastic connecting plate 22 share the same radius of curvature but protrude toward the directions opposite to each other with respect to the line linking the one end portions 21a, 22a and the axial line O, respectively, and the third curved portions 21f, 22f of each first elastic connecting plate 21 and the corresponding second elastic connecting plate 22 share the same radius of curvature but protrude toward the directions opposite to each other with respect to the line linking the one end portions 21a, 22a and the axial line O, respectively.

Accordingly, as shown by a representative pair of the first elastic connecting plate 21 and the second elastic connecting plate 22 emphasized by solid lines in FIG. 5, the connecting members 15 have configurations wherein each first elastic connecting plate 21 and the corresponding second elastic connecting plate, 22 of which respective one end portions 21a, 22a overlap in a tire side view, are symmetric with respect to an imaginary line L extending in the tire radial direction and passing through the one end portions 21a, 22a of the elastic connecting plates 21, 22.

Further, in each of the first elastic connecting plate 21 and the second elastic connecting plate 22, a portion on the one end portion 21a, 22a side thereof, which extends from the aforementioned middle portion thereof in the extending direction to the one end portion 21a, 22a, is thicker than a portion on the other end portion 21b, 22b side thereof, which extends from the middle portion thereof to the other end portion 21b, 22b, in a tire side view, as shown in FIG. 5. As a result, it is possible to enhance strength of the portion on the one end portion 21a, 22a side, of each of the first and second elastic connecting plates 21, 22, which portion often receives large load, with suppressing an increase in weight of the connecting member 1 and also ensuring flexibility thereof. It should be noted that the portion on the one end portion 21a, 22a side and the portion on the other end portion 21b, 22b side, of each of the first and second elastic connecting plates 21, 22, are smoothly and continuously structured without steps.

The ring member 14 may be divided, for example, at the middle portion in the tire width direction thereof, into one-side split ring member to be positioned on one side in the tire width direction and the other-side split ring member to be positioned on the other side in the tire width direction. In this case, the one-side split ring member may be formed to be integral with the first elastic connecting plates 21 and the other-side split ring member may be formed to be integral with the second elastic connecting plates 22. In this regard, the one-side split ring member may be formed to be integral with the first elastic connecting plates 21 by injection molding and the other-side split ring member may be formed to be integral with the second elastic connecting plates 22 by injection molding.

The inner rim 12 is externally fitted onto the wheel 11, whereby the ring member 14 is fixed to the wheel 11.

In the non-pneumatic tire 10 of the present embodiment, the aforementioned skeleton portion corresponds to the ring member 14 and the connecting member 15 of the non-pneumatic tire, wherein the inner rim 12, the outer rim 13, and the connecting member 15 of the ring member 14 are formed by the polyester material described above. The tread member 16, on the other hand, is formed by the rubber material described above. An adhesive layer 25 composed of the urethane-based adhesive or then epoxy-based adhesive described above is provided between the outer rim 13 and the tread member 16.

It is possible to provide an inexpensive non-pneumatic tire by forming the inner rim 12, the outer rim 13, and the connecting member 15 by the polyester material described above.

Further, it is possible to improve adhesion between the outer rim 13 and the tread member 16 and thus durability of a tire by adhering the outer rim 13 and the tread member 16 to each other by way of the adhesive layer 25 therebetween composed of the urethane-based adhesive or then epoxy-based adhesive.

In the non-pneumatic tire 10 of the present embodiment, the inner rim 12, the outer rim 13, and the connecting member 15 need to be formed by the polyester material described above. Resin compositions used for the inner rim 12, the outer rim 13, and the connecting member 15 collectively constituting the skeleton member may be different from each other in this regard.

In the non-pneumatic tire 10 of the present embodiment, the tread member 16 is formed by vulcanized rubber provided on the outer side in the tire radial direction of the outer rim 13 of the ring member 14. Specifically, the tread member 16 is formed to be cylindrical such that it integrally covers the entire region of the outer periphery of the outer rim 13 of the ring member 14 in the present embodiment, be tread rubber 16 is formed, for example, by a vulcanized rubber obtained by subjecting a rubber composition containing natural rubber and other components to vulcanization in terms of ensuring satisfactory wear resistance and the like.

Next, another example of the connecting member for connecting the inner rim 12 and the outer rim 13 will be described below.

Figure 6A:
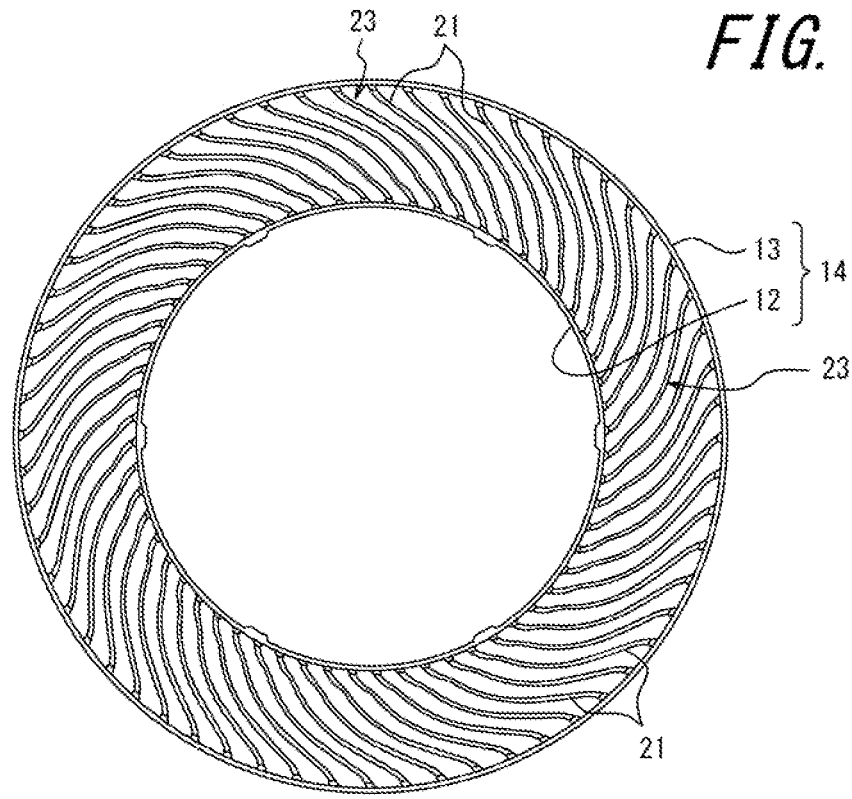
FIG. 6A is a side view showing an inner rim and an outer rim connected by a connecting member according to another example of the composite body.
Figure 6B:
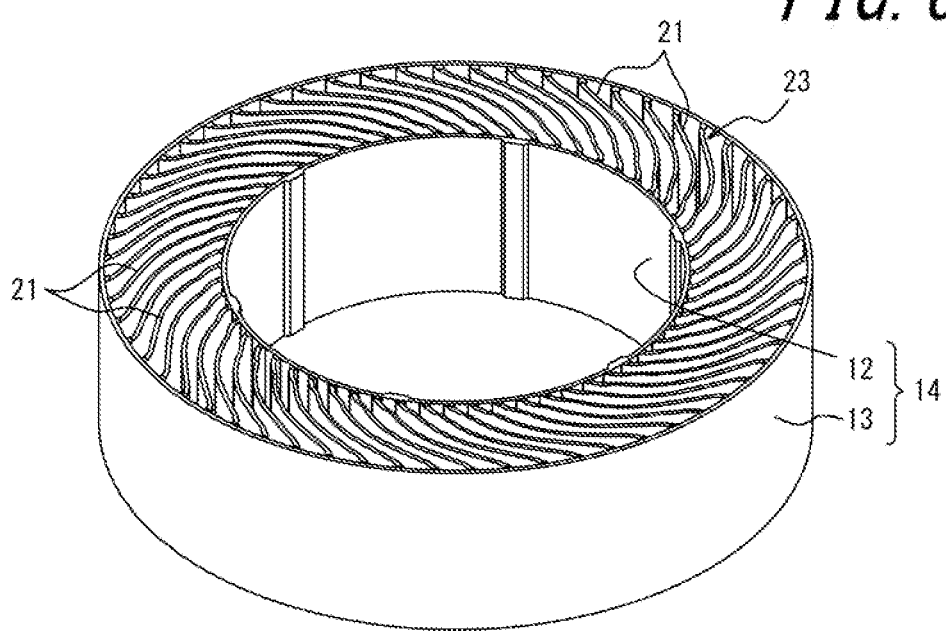
FIG. 6B is a perspective view showing the inner rim and the outer rim connected by the connecting member according to said another example of the composite body.

FIG. 6A is a side view and FIG. 68 is a perspective view, respectively showing an inner rim and an outer rim connected by a connecting member according to another example of the composite body. As shown in FIG. 6A and FIG. 6B, a connecting member 23 is constituted of only the first elastic connecting plates 21 and different in this regard from the connecting member 15 constituted of the first elastic connecting plates 21 and the second elastic connecting plates 22, of the example shown in FIG. 4 and FIG. 5. A plurality of the first elastic connecting plates 21 constituting the connecting member 23 is provided in a tire circumferential direction between the inner rim 12 and the outer rim 13, thereby connecting the two rims 12, 13. Other structures and effects of the connecting member 23 are the same as those of the connecting member 15.

EXAMPLES

The present disclosure will be described further in detail by Examples hereinafter. The Examples by no means restrict the present disclosure.

<<Test A>>

Examples A1 and A3-A9, Comparative Examples A1-A2, and Reference Examples A1-A4

(Preparation of Resin-Rubber-Resin Composite)

Rubber compositions having blend formulations shown in Table 1 were prepared according to the conventional method, respectively. Rubber sheets were then prepared from the rubber compositions thus obtained. A rubber piece (7.5 cm (length)×2.5 cm (width)×2.0 mm (thickness)) was cut out from each of the rubber sheets thus prepared. The rubber pieces thus cut out were subjected to vulcanization at 160° C. for 15 minutes, whereby rubber test pieces (rubber member samples) were prepared.

It should be noted that each of the rubber compositions used in the aforementioned Examples. Comparative Examples and Reference Examples was blended with, other than the components shown in Table 1, the following components: 2.5 parts by mass of zinc white; 1.5 parts by mass of sulfur; 0.5 pans by mass of vulcanization accelerator D-G (product name "Sanceler D-G" manufactured by San Shin Chemical Industry Co., Ltd.); 0.3 parts by mass of vulcanization accelerator DM-P (product name "Noccelar DM-P" manufactured by Ouchi Shinko Chemical Industrial Co., Ltd.); and 0.5 parts by mass of vulcanization accelerator NS-P (product name "Noccelar NS-P" manufactured by Ouchi Shinko Chemical Industrial Co., Ltd.) with respect to 100 parts by mass of the rubber component.

Resin test pieces (15.0 cm (length)×2.5 cm (width)×2.5 mm (thickness)) were prepared as resin member samples. A surface of each of the resin test pieces was rubbed with sandpaper such that the surface had a surface roughness (Ra) shown in Table 1. The material type and the count of sandpaper used for each of the resin test pieces are shown in Table 1.

An adhesive was coated on each of the resin test pieces (the resin member samples), so that an adhesive layer having thickness of 70 μm to 200 μm was formed on the resin test piece. The type of the adhesive thus used is shown in Table 1.

Next, the top surface of each of the rubber test pieces (the rubber member samples) was attached to the adhesive layer of one resin test piece prepared as described above and the rear surface of the rubber test piece (the rubber member sample) was attached to the adhesive layer of another resin test piece such that the corresponding ends of the two resin test pieces were aligned, whereby each of resin-rubber-resin composite samples (having a sandwich structure of the resin member/the adhesive layer/the rubber member/the adhesive layer/the resin member) was obtained.

Initial peeling stress, peeling stress after deterioration, and the adhesive layer interface breakage rate were evaluated for each of the resin-rubber-resin composite samples thus obtained, by the method described below. The results are shown in Table 1.

(1) Initial Peeling Stress

Respective resin end portions not in contact with the rubber, of each of the resin-rubber-resin composite samples, were clamped and pulled in a tearing manner at a drawing speed of 100 mm/minute by a tensile testing machine, whereby peeling stress was measured according to a T-peel test. The peeling stress of each of the resin-rubber-resin composite samples was expressed by an index relative to the peeling stress value of Example A1 being "100". The larger index value represents the larger initial peeling stress, i.e. the better adhesion properties.

(2) Peeling Stress after Deterioration

Each of the resin-rubber-resin composite samples was subjected to a deterioration treatment at 80° C. and 95% RH for nine days. Peeling stress of the resin-rubber-resin composite sample thus deteriorated was measured in the same manner as the initial peeling stress test. The peeling stress of each of the resin-rubber-resin composite samples was expressed by an index relative to the peeling stress value of Example A1 being "100". The larger index value represents the larger peeling stress after deterioration, i.e. the better adhesion properties.

(3) Adhesive Layer Interface Breakage Rate

A state of breakage, of each of the resin-rubber-resin composite samples after "the peeling stress test after deterioration", was visually analyzed and a proportion of breakage (peeling) at the interfaces of the adhesive layers was determined. Cohesive failure had occurred in the rubber in the portions which had not broken, of the interfaces of the adhesive layer. The smaller adhesive layer interface breakage rate represents the better adhesion between the resin member and the rubber member.

(Preparation of Tire)

Tire samples, each of which had the structure shown in FIG. 3, were prepared by using the relevant resin materials shown in Table 1 as the skeleton member, the relevant rubber compositions having the compositions shown in Table 1 as the tread member, and the relevant adhesives shown in Table 1, respectively.

(4) Resistance to Deterioration by Ozone

A surface state of the tread member of each of the tire samples, after exposure to ozone (concentration: 50 pphm) at 40° C. for 15 hours according to JIS K6259, was visually analyzed. The evaluation criteria in the analysis are as follows.

A: A small number of cracks were observed.
B: A large number of cracks were observed.
C: Numerous cracks were observed.

Example A2

A resin-rubber-resin composite sample of Example A2 is prepared by using the relevant resin member, the relevant adhesive, and the relevant rubber member shown in Table 1 and then initial peeling stress, peeling stress after deterioration, and the adhesive layer interface breakage rate thereof are evaluated in the same manner as Example A1. Further, a tire sample is prepared by using the relevant resin material shown in Table 1 as the skeleton member, the relevant rubber composition having the composition shown in Table 1 as the tread member, and the relevant adhesive shown in Table 1. Resistance to deterioration by ozone of the tire sample is evaluated.

TABLE 1

| | | | Example A1 | Example A2 | Example A3 | Example A4 | Example A5 | Example A6 | Example A7 | Example A8 |
|---|---|---|---|---|---|---|---|---|---|---|
| Resin member | Material | — | TPC *9 | TPC *9 | TPC *9 | TPC *9 | TPC *9 | TPC *9 | PBT *10 | TPC *9 |
| | Sandpaper for use (count) | — | #240 | #240 | #240 | #240 | #240 | #240 | #240 | #240 |
| | Surface roughness (Ra) | μm | 3.62 | 3.60 | 3.55 | 3.59 | 3.61 | 3.69 | 3.32 | 3.55 |
| Adhesive | Type | — | Urethane-based adhesive A *12 | Urethane-based adhesive A *12 | Urethane-based adhesive A *12 | Urethane-based adhesive A *12 | Urethane-based adhesive A *12 | Urethane-based adhesive A *12 | Urethane-based adhesive A *12 | Urethane-based adhesive B *13 |
| Composition of rubber member | Natural rubber *1 | Parts by mass | 80 | 70 | 80 | 80 | 70 | 80 | 80 | 80 |
| | Butadiene rubber *2 | | 20 | — | 20 | 20 | — | — | 20 | 20 |
| | Styrene-butadiene rubber *3 | | — | 30 | — | — | 30 | 30 | — | — |
| | Carbon black *4 | | 50 | 50 | 50 | 50 | 20 | 50 | 50 | 50 |
| | Silica *5 | | — | — | — | — | 30 | — | — | — |
| | Process oil *6 | | 10 | 10 | 10 | 10 | 10 | 10 | 10 | 10 |
| | Antioxidant *7 | | 1.5 | — | 1 | 1 | 1 | 2 | 1.5 | 1.5 |
| | Surfactant *8 | | — | — | — | 1.5 | 2 | 1 | — | — |
| | Stearic acid | | 1.5 | 1.5 | 1.5 | 1.5 | 1.5 | 1.5 | 1.5 | 1.5 |
| Evaluation results | Initial peeling stress | Index | 100 | 102 | 91 | 101 | 81 | 59 | 112 | 95 |
| | Peeling stress after deterioration | Index | 100 | 105 | 93 | 100 | 22 | 18 | 110 | 94 |
| | Adhesive layer interface breakage rate | % | <1 | <1 | <1 | 5 | 75 | 68 | <1 | 5 |
| | Resistance to deterioration by ozone | — | A | C | B | B | B | A | A | A |

TABLE 1-continued

|  |  |  | Example A9 | Comp. Ex. A1 | Comp. Ex. A2 | Reference Ex. A1 | Reference Ex. A2 | Reference Ex. A3 | Reference Ex. A4 |
|---|---|---|---|---|---|---|---|---|---|
| Resin member | Material | — | TPC *9 | TPC *9 | TPC *9 | TPA *11 | TPA *11 | TPA *11 | TPA *11 |
|  | Sandpaper for use (count) | — | #240 | #240 | #240 | #240 | #240 | #240 | #240 |
|  | Surface roughness (Ra) | μm | 3.63 | 3.59 | 3.68 | 3.41 | 3.32 | 3.25 | 3.38 |
| Adhesive | Type | — | Epoxy-based adhesive B *15 | Acrylate-based adhesive *16 | Chloroprene-based adhesive *17 | Urethane-based adhesive A *12 | Epoxy-based adhesive A *14 | Acrylate-based adhesive *16 | Chloroprene-based adhesive *17 |
| Composition of rubber member | Natural rubber *1 | Parts by mass | 80 | 80 | 80 | 80 | 80 | 80 | 80 |
|  | Butadiene rubber *2 |  | 20 | 20 | 20 | 20 | 20 | 20 | 20 |
|  | Styrene-butadiene rubber *3 |  | — | — | — | — | — | — | — |
|  | Carbon black *4 |  | 50 | 50 | 50 | 50 | 50 | 50 | 50 |
|  | Silica *5 |  | — | — | — | — | — | — | — |
|  | Process oil *6 |  | 10 | 10 | 10 | 10 | 10 | 10 | 10 |
|  | Antioxidant *7 |  | 1.5 | 1.5 | 1.5 | 1.5 | 1.5 | 1.5 | 1.5 |
|  | Surfactant *8 |  | — | — | — | — | — | — | — |
|  | Stearic acid |  | 1.5 | 1.5 | 1.5 | 1.5 | 1.5 | 1.5 | 1.5 |
| Evaluation results | Initial peeling stress | Index | 103 | 6 | 5 | 98 | 105 | 10 | 4 |
|  | Peeling stress after deterioration | Index | 103 | 3 | 4 | 99 | 100 | 6 | 3 |
|  | Adhesive layer interface breakage rate | % | <1 | 100 | 100 | <1 | <1 | 100 | 100 |
|  | Resistance to deterioration by ozone | — | A | A | A | A | A | A | A |

*1 Natural rubber:
*2 Butadiene rubber: product name "150L" manufactured by Ube Industries, Ltd.
*3 Styrene-butadiene rubber: product name "SL563" manufactured by JSR Corporation
*4 Carbon black: product name "SEAST KH" (N339) manufactured by Tokai Carbon Co., Ltd.
*5 Silica: product name "Nipsil AQ" manufactured by Tosoh Corporation (formerly Nippon Silica Industries)
*6 Process oil: product name "Diana Process Oil NS-28" manufactured by Idemitsu Kosan Co., Ltd.
*7 Antioxidant: amine-based antioxidant, product name "Noclac 6C" manufactured by Ouchi Shinko Chemical Industrial Co., Ltd.
*8 Surfactant: product name "FARMIN DM8098" manufactured by Kao Corporation.
*9 TPC: thermoplastic copolyester, product name "Hytrel 5557" manufactured by Dupont de Nemours, Inc.
*10 PBT: polybutylene terephthalate, product name "1401X06" manufactured by TORAY Industries, Inc.
*11 TPA: thermoplastic polyamide elastomer, product name "XPA9055" manufactured by Ube Industries, Ltd.
*12 Urethane-based adhesive A: product name "7542A/B" manufactured by LORD CORPORATION
*13 Urethane-based adhesive B: product name "DA3146" manufactured by NOGAWA CHEMICAL Co., Ltd.
*14 Epoxy-based adhesive A: product name "Fusor 305" manufactured by LORD CORPORATION
*15 Epoxy-based adhesive B: product name "T-88" manufactured by System Three Resins, Inc.
*16 Acrylate-based adhesive: modified acrylate-based adhesive, product name "MA300" manufactured by PLEXUX Corporation
*17 Chloroprene-based adhesive: product name "Ecowhite" manufactured by Bridgestone Americas, Inc.

It is understood from the results shown in Table 1 that adhesion between the member composed of a polyester material and the member composed of a rubber material can be significantly improved by attaching these two members by way of an adhesive layer composed of a urethane-based adhesive or an epoxy-based adhesive. Further, it is understood that adhesion (adhesion after deterioration in particular) between the member composed of a polyester material and the member composed of a rubber material can be significantly improved by employing as the rubber material a rubber composition in which the total content of antioxidant, stearic acid and surfactant (dispersant) is 4.5 parts by mass with respect to 100 parts by mass of a rubber component.

<<Test B>>

Examples B1-B6

(Preparation of Resin-Rubber-Resin Composite)
Rubber compositions having blend formulations shown in Table 2 were prepared according to the conventional method, respectively. Rubber sheets were then prepared from the rubber compositions thus obtained. A rubber piece 1 (7.5 cm (length)×2.5 cm (width)×(thickness) as shown in Table 2) as "Rubber member 1" and two rubber pieces 2 (7.5 cm (length)×2.5 cm (width)×(thickness) as shown in Table 2) as "Rubber members 2" were cut out from each of the rubber sheets thus prepared. Each rubber piece 1 (Rubber member 1) was sandwiched by the corresponding two rubber pieces 2 (Rubber members 2) and subjected to vulcanization at 160° C. for 15 minutes for vulcanization bonding, whereby respective rubber composite bodies (Rubber member 2/Rubber member 1/Rubber member 2) were prepared.

It should be noted that each of the rubber compositions used in the aforementioned Examples was blended with, other than the components shown in Table 2, the following components: 2.5 parts by mass of zinc white; 1.5 parts by mass of sulfur 0.5 parts by mass of vulcanization accelerator D-G (product name "Sanceler D-G" manufactured by San Shin Chemical Industry Co., Ltd.); 0.3 parts by mass of vulcanization accelerator DM-P (product name "Noccelar DM-P" manufactured by Ouchi Shinko Chemical Industrial Co., Ltd.); and 0.5 parts by mass of vulcanization accelerator NS-P (product name "Noccelar NS-P" manufactured by Ouchi Shinko Chemical Industrial Co., Ltd.) with respect to 100 parts by mass of the rubber component.

Resin test pieces (15.0 cm (length)×2.5 cm (width)×2.5 mm (thickness)) were prepared as resin member samples. A surface of each of the resin test pieces was rubbed with sandpaper such that the surface had a surface roughness (Ra) shown in Table 2. The material type and the count of sandpaper used for each of the resin test pieces are shown in Table 2.

An adhesive was coated on each of the resin test pieces (the resin member samples), so that an adhesive layer having thickness of 70 µm to 200 µm was formed on the resin test piece.

Next, the top surface of each of the rubber composite bodies (Rubber member 2/Rubber member 1/Rubber member 2) was attached to the adhesive layer of one resin test piece prepared as described above and the rea surface of the same rubber composite body was attached to the adhesive layer of another resin test piece such that the corresponding ends of the two resin test pieces were aligned, whereby each of resin-rubber-resin composite samples (having a sandwich structure of the resin member/the adhesive layer/Rubber member 2/Rubber member 1/Rubber member 2/the adhesive layer/the resin member) was obtained.

The material type of each of the resin test pieces, as well as the type of the adhesive, for use in Examples B1-B6 are shown in Table 2.

Initial peeling stress, peeling stress after deterioration, and the adhesive layer interface breakage rate were evaluated for each of the resin-rubber-resin composite samples thus obtained, by the method described above. In the evaluation of the initial peeling stress and the peeling stress after deterioration, each peeling stress value was expressed by an index relative to the peeling stress value of Example B1 being "100".

(Preparation of Tire)

Tire samples, each of which had the structure shown in FIG. 3, were prepared by using the relevant resin materials shown in Table 2 as the skeleton member, the relevant rubber compositions having the compositions shown in Table 2 as the tread member, and the relevant adhesives shown in Table 2, respectively. The tread member had a two-layer structure, wherein a rubber layer adjacent to the adhesive layer employed the rubber composition having a composition of Rubber member 2 and a rubber layer not adjacent to the adhesive layer, i.e. a rubber layer on the ground-contact surface side, employed the rubber composition having a composition of Rubber member 1.

Resistance to deterioration by ozone was evaluated for each of the tire samples thus obtained, by the method described above. Further, wear resistance of the tire sample was evaluated by the method described below.

(5) Wear Resistance

A surface of the tread member of each of the tire samples was worn by applying a constant force thereon by an abrasion tester and an amount of resulting wear of the tread member was measured. The inverse number of the amount of wear of the tread member thus measured, was obtained. The inverse number thus obtained was then convened to an index value relative to the inverse number of the amount of wear of the tread member of Example B2 being "100", which index value represents wear resistance of the tire sample. The larger index value represents the smaller amount of wear, i.e. the higher wear resistance.

TABLE 2

| | | | Example B1 | Example B2 | Example B3 | Example B4 | Example B5 | Example B6 |
|---|---|---|---|---|---|---|---|---|
| Resin member | Material | — | TPC *9 | TPC *9 | TPC *9 | TPC *9 | TPC *9 | TPC *9 |
| | Sandpaper for use (count) | — | #240 | #240 | #240 | #240 | #240 | #240 |
| | Surface roughness (Ra) | µm | 3.59 | 3.55 | 3.68 | 3.51 | 3.62 | 3.55 |
| Adhesive | Type | — | Urethane-based adhesive A *12 | Urethane-based adhesive A *12 | Urethane-based adhesive A *12 | Urethane-based adhesive A *12 | Urethane-based adhesive A *12 | Urethane-based adhesive A *12 |
| Composition of Rubber member 1 | Natural rubber *1 | Parts by mass | 70 | 70 | 80 | 70 | 80 | 80 |
| | Butadiene rubber *2 | | — | — | 20 | — | 20 | 20 |
| | Styrene-butadiene rubber *3 | | 30 | 30 | — | 30 | — | — |
| | Carbon black *4 | | 35 | 20 | 50 | 50 | 50 | 50 |
| | Silica *5 | | — | 30 | — | — | — | — |
| | Process oil *6 | | 10 | 10 | 10 | 10 | 10 | 10 |
| | Antioxidant *7 | | — | 2 | 1.5 | — | 2 | 2 |
| | Surfactant *8 | | 3 | 2.5 | 2 | 3 | 2 | 2 |
| | Stearic acid | | 1.5 | 1.5 | 1.5 | 1.5 | 1.5 | 1.5 |
| Thickness of Rubber member 1 | | mm | 1.5 | 1.5 | 1.5 | 1.5 | 1.5 | 1.5 |
| Composition of Rubber member 2 | Natural rubber *1 | Parts by mass | 70 | 70 | 70 | 70 | 70 | 70 |
| | Butadiene rubber *2 | | — | — | — | — | — | — |
| | Sytrene-butadiene rubber *3 | | 30 | 30 | 30 | 30 | 30 | 30 |
| | Carbon black *4 | | 50 | 20 | 20 | 20 | 20 | 50 |
| | Silica *5 | | — | 30 | 30 | 30 | 30 | — |
| | Process oil *6 | | 10 | 10 | 10 | 10 | 10 | 10 |
| | Antioxidant *7 | | — | 1 | 1 | 1 | 1 | 2 |
| | Surfactant *8 | | — | — | — | — | — | — |
| | Stearic acid | | 1.5 | 1.5 | 1.5 | 1.5 | 1.5 | 1.5 |
| Thickness of Rubber member 2 | | mm | 1.5 | 1.5 | 1.5 | 1.5 | 1.5 | 1.5 |
| Evaluation Results | Initial peeling stress | Index | 100 | 80 | 98 | 101 | 90 | 91 |
| | Peeling stress after deterioration | Index | 100 | 20 | 99 | 102 | 91 | 90 |

TABLE 2-continued

|  |  | Example B1 | Example B2 | Example B3 | Example B4 | Example B5 | Example B6 |
|---|---|---|---|---|---|---|---|
| Adhesive layer interface breakage rate | % | <1 | 71 | <1 | <1 | <1 | <1 |
| Resistance to deterioration by ozone | — | C | A | A | C | A | A |
| Wear resistance | Index | 43 | 100 | 101 | 103 | 101 | 110 |

*1 to *9 and *12 are defined in the same manner as those of Table 1.

It is understood from Table 2 that it is possible to improve resistance to deterioration by ozone (weatherproofness) and wear resistance of the member composed a rubber material, with improving adhesion between the member composed of a polyester material and the member composed of the rubber material, by: dividing the rubber member into "Rubber member 2" (a portion $1b_1$ adjacent to the adhesive layer $1c$) and "Rubber member 1" (a portion $1b$, not adjacent to the adhesive layer $1c$); employing as Rubber member 2 a rubber composition in which the total content of antioxidant, stearic acid and surfactant (dispersant) is ≤4.5 parts by mass with respect to 100 parts by mass of a rubber component; and employing as Rubber member 1 a rubber composition in which the total content of antioxidant, stearic acid and surfactant (dispersant) is >4.5 parts by mass with respect to 100 pans by mass of a rubber component.

REFERENCE SIGNS LIST

1: Composite body
1a: Member composed of polyester material
1b: Member composed of rubber material
$1b_1$: Portion adjacent to adhesive layer, of the member composed of rubber material
$1b_2$: Portion not adjacent to adhesive layer, of the member composed of rubber material
1c: Adhesive layer
2: Non-pneumatic tire
3: Wheel portion
3a: Fitting rim portion
3b: Rib
3c: Outer fitting rim portion
3d: Boss
4: Connecting member
4a: Inner portion
4b: Outer portion
5: Outer rim
6: Tread member
7: inner rim
8: Tire portion
9: Adhesive layer
10: Non-pneumatic tire
11: Wheel portion
12: Inner rim
13: Outer rim
14: Ring member
15: Connecting member
16: Tread member
17: Fitting rim portion
18: Outer ring portion
19: Rib
21: First elastic connecting plate (Connecting member)
21a: One end portion
21b: The other end portion
21c: Intermediate portion
21d-21f: Curved portions
22: Second elastic connecting plate (Connecting member)
22a: One end portion
22b: The other end portion
22c: Intermediate portion
22d-22f: Curved portions
23: Connecting member
25: Adhesive layer

The invention claimed is:

1. A tire having a composite body, wherein the composite body comprises:
   a member composed of a polyester material;
   a member composed of a rubber material; and
   an adhesive layer composed of a urethane-based adhesive or an epoxy-based adhesive and provided between the member composed of a polyester material and the member composed of a rubber material,
   wherein the tire is a non-pneumatic tire having a skeleton member and a tread member provided on the tire radial direction outer side of the skeleton member along at least a portion thereof, wherein: the skeleton member is the member composed of the polyester material and the tread member is the member composed of the rubber material; and the adhesive layer is provided between the skeleton member and the tread member, and
   the tread member has a plurality of rubber layers and the total content of antioxidant, stearic acid and surfactant is larger in a rubber layer thereof on the ground-contact side than in a rubber layer thereof adjacent to the adhesive layer.

2. The tire of claim 1, wherein the polyester material includes at least one selected from the group consisting of polybutylene terephthalate and thermoplastic copolyester.

3. The tire of claim 2, wherein the adhesive layer is composed of a urethane-based adhesive.

4. The tire of claim 2, wherein at least a portion adjacent to the adhesive layer, of the member composed of a rubber material, is composed of a rubber composition in which the total content of antioxidant, stearic acid and surfactant is ≤4.5 parts by mass with respect to 100 parts by mass of a rubber component.

5. The tire of claim 2, wherein surface roughness (Ra) of the member composed of a polyester material is in the range of 2 μm to 20 μm and said surface roughness (Ra) represents arithmetic average roughness (Ra) as prescribed by JIS B0601: 2001.

6. The tire of claim 1, wherein the adhesive layer is composed of a urethane-based adhesive.

7. The tire of claim 6, wherein at least a portion adjacent to the adhesive layer, of the member composed of a rubber material, is composed of a rubber composition in which the total content of antioxidant, stearic acid and surfactant is ≤4.5 parts by mass with respect to 100 parts by mass of a rubber component.

8. The tire of claim 6, wherein surface roughness (Ra) of the member composed of a polyester material is in the range of 2 μm to 20 μm and said surface roughness (Ra) represents arithmetic average roughness (Ra) as prescribed by JIS B0601: 2001.

9. The tire of claim 1, wherein at least a portion adjacent to the adhesive layer, of the member composed of a rubber material, is composed of a rubber composition in which the total content of antioxidant, stearic acid and surfactant is ≤4.5 parts by mass with respect to 100 parts by mass of a rubber component.

10. The tire of claim 9, wherein a content of the antioxidant in the rubber composition is ≥1 parts by mass with respect to 100 parts by mass of the rubber component.

11. The tire of claim 1, wherein surface roughness (Ra) of the member composed of a polyester material is in the range of 2 μm to 20 μm and said surface roughness (Ra) represents arithmetic average roughness (Ra) as prescribed by JIS B0601: 2001.

12. The tire of claim 1, wherein the tread member is constituted of two rubber layers.

13. The tire of claim 1, wherein a thickness of each of the rubber layers is constant in the tire circumferential direction.

14. The tire of claim 1, wherein the rubber layer adjacent to the adhesive layer, of the tread member, contains no antioxidant, stearic acid and surfactant.

15. The tire of claim 1, wherein in the tread member a ratio of thickness of the rubber layer thereof adjacent to the adhesive layer with respect to thickness of the rubber layer thereof on the ground-contact side is in the range of 1/1 to 1/9.

16. A tire structure, including:
the non-pneumatic tire of claim 1; and
a wheel portion attachable to an axle;
wherein the non-pneumatic tire has:
an inner rim fitted onto the wheel portion;
an outer rim configured to surround the inner rim from the outer side in the tire radial direction;
a plurality of connecting members provided along the tire circumferential direction between the inner rim and the outer rim and configured to connect the two rims; and
the tread member disposed on the outer side in the tire radial direction of the outer rim,
wherein: each of the inner rim, the outer rim and the connecting member collectively constituting the skeleton member is the member composed of the polyester material; the tread member is the member composed of the rubber material; and the adhesive layer is provided between the outer rim and the tread member.

* * * * *